United States Patent [19]

Elton et al.

[11] Patent Number: 5,332,284
[45] Date of Patent: Jul. 26, 1994

[54] PASSENGER CAR SEAT ASSEMBLY WITH INTEGRAL CHILD SEAT

[75] Inventors: Robert D. Elton, Ann Arbor; Randy D. Hurn, Livonia; DeWitt R. Mulhearn, Detroit, all of Mich.

[73] Assignee: Hoover Universal, Inc., Plymouth, Mich.

[21] Appl. No.: 925,023

[22] Filed: Aug. 5, 1992

[51] Int. Cl.$^5$ .............................. A47C 15/00
[52] U.S. Cl. ...................... 297/238; 297/484; 297/467; 297/250.1
[58] Field of Search ............ 297/238, 484, 467, 250.1

[56] References Cited

U.S. PATENT DOCUMENTS

| | | | |
|---|---|---|---|
| 4,376,551 | 3/1983 | Cone | 297/484 X |
| 4,533,176 | 8/1985 | Wyttenback | 297/238 |
| 4,540,216 | 9/1985 | Hassel | 297/238 |
| 4,632,460 | 12/1986 | Meeker et al. | 297/467 |
| 4,660,889 | 4/1987 | Anthony et al. | 297/467 |
| 4,681,367 | 7/1987 | Timmers | 297/238 X |
| 4,690,455 | 9/1987 | Bailey et al. | |
| 4,756,573 | 7/1988 | Simin et al. | |
| 4,900,086 | 2/1990 | Steward | |
| 4,900,087 | 2/1990 | Crisp | |
| 4,936,627 | 6/1990 | Guim | |
| 5,026,118 | 6/1991 | Vander Stel et al. | |
| 5,135,285 | 8/1992 | Dukatz et al. | 297/484 |
| 5,160,186 | 11/1992 | Lee | 297/484 X |
| 5,161,855 | 11/1992 | Harmon | 297/238 |

FOREIGN PATENT DOCUMENTS

| | | | |
|---|---|---|---|
| 1243930 | 11/1988 | Canada | 297/467 |
| 295838 | 12/1988 | European Pat. Off. | 297/484 |
| 2023415 | 1/1980 | United Kingdom | 297/238 |

Primary Examiner—Peter M. Cuomo
Assistant Examiner—Jerry Redman
Attorney, Agent, or Firm—Harness, Dickey & Pierce

[57] ABSTRACT

A seat assembly for a passenger car including an integral child seat assembly. The frame of the seat back carries seat belt loading from the child seat restraint system receiving the load directly from the seat belts and transferring a load efficiently to the floor pan and rear shelf of the motor vehicle to provide a short load path requiring a minimal number of components.

11 Claims, 3 Drawing Sheets

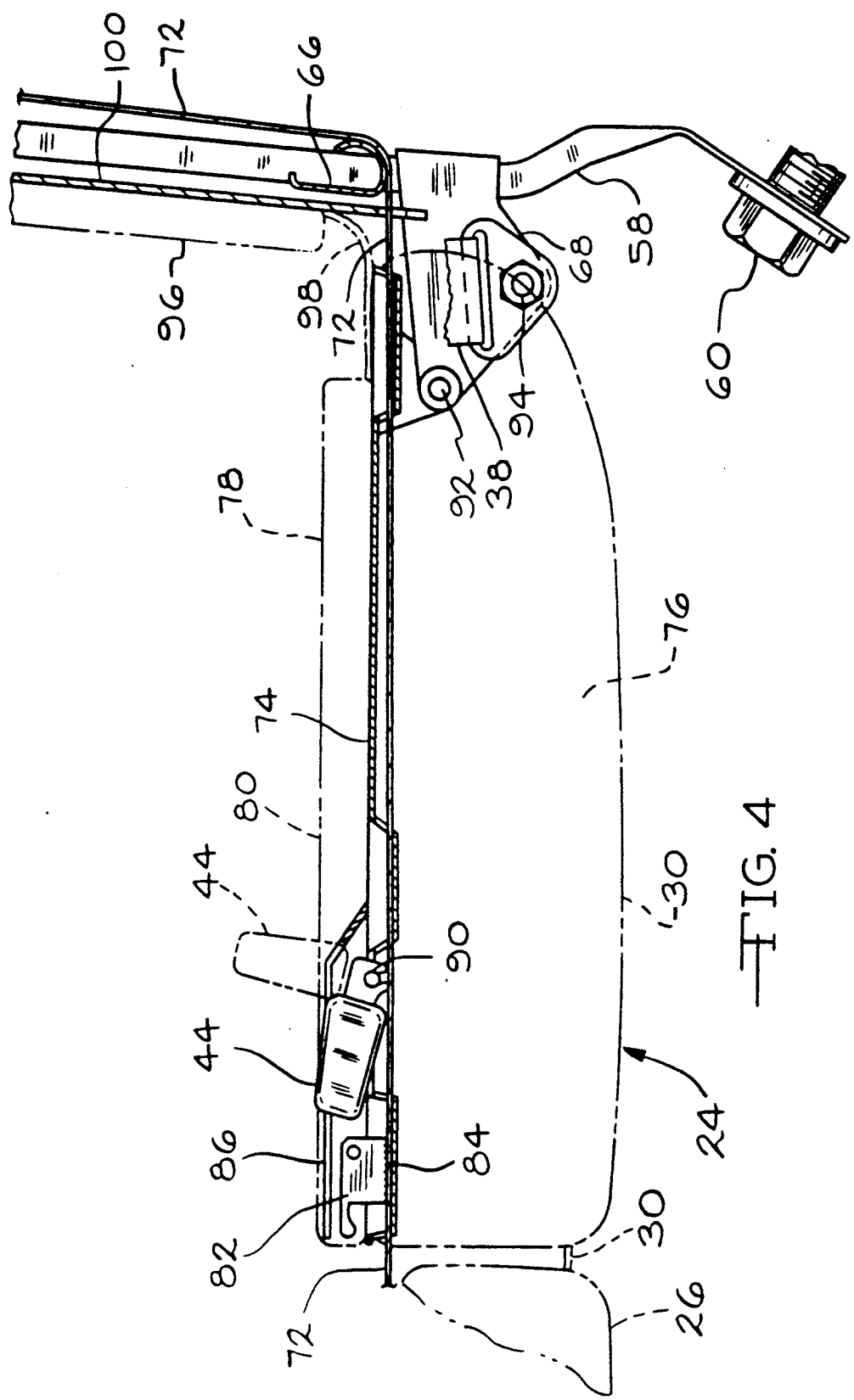

PASSENGER CAR SEAT ASSEMBLY WITH INTEGRAL CHILD SEAT

BACKGROUND AND SUMMARY OF THE INVENTION

The present invention relates to a vehicle seat assembly including an integral child seat and in particular to a seat assembly for a passenger car vehicle. The integral seat is conveniently stored within the seat back of the seat assembly enabling the seat assembly to be used by an adult passenger. When desired, the child seat can be deployed for use in providing seating for a small child.

Child seats, integrally formed with an adult seat of a motor vehicle, have recently become a popular option offered by many vehicle manufacturers. Initially, such seat assemblies were available only in van type vehicles. In vans, the seat assembly is mounted to the vehicle floor. The seat belts for adult passengers are also mounted to the floor such that restraint loads are transferred directly from the belts to the vehicle floor structure. The seat belts for the child seat assembly, however, transfer the belt loads to the seat back where the loads are carried through the seat assembly structure and ultimately to the vehicle floor structure.

Child seats are now being integrated into seat assemblies for passenger car vehicles. In developing such seats, two approaches have been taken. One approach is to form a child seat module that is provided as a single unit attached to the existing frame of the seat assembly when the child seat option is desired. The other approach is to provide a unique seat frame and structure for the vehicle seat assembly incorporating a child seat. The module approach provides for ease in manufacture of the seat but makes certain compromises that result in a less comfortable seat assembly as well as adding excess weight to the seat assembly. In addition, the path for the child seat belt loads proceeds from the belts to the child seat module, from the module to the seat back frame and from the seat back frame to the motor vehicle body.

With a unique frame for seat assemblies that include a child seat, and by attaching the individual child seat components directly to the seat back frame, the load path for the child seat belt loads can be shortened to transfer the loads directly from the child seat belts to the seat frame. The seat frame components carrying the seat belt load can be directly mounted to the vehicle structure creating a short and efficient load path to minimize the quantity of load carrying components in the seat assembly and thus reducing the weight of the seat assembly.

In typical vehicle designs with the seat belts attached directly to the vehicle structure, the seat assembly itself does not carry any of the seat belt loads. Thus, in a vehicle collision, the only forces acting on the seat structure will be due to the mass of the seat assembly. As a result, in a rear bench seat assembly, the seat back is normally only attached to the vehicle floor pan at the base of the seat back. At the upper end of the seat back, a hook or other retaining means may be provided to engage the shelf behind the seat back to limit forward deflection but this is not a strong attachment of the seat back to the shelf back.

With an integral child seat, the seat back will be required to carry the belt loads from the child seat. It is now desirable to provide additional load carrying attachments of the seat back to the motor vehicle.

According to the present invention, the seat back frame is attached directly to the vehicle shelf through a load carrying bracket. Preferably, the bracket is attached to that component of the seat back frame to which the child seat belt loads are applied to create a short and direct path for the belt loads.

Further objects, features and advantages of the invention will become apparent from a consideration of the following description and the appended claims when taken in connection with the accompanying drawings.

BRIEF DESCRIPTION OF THE DRAWINGS

FIG. 4 is a side elevational/sectional view of the child seat structure; and

DETAILED DESCRIPTION OF THE INVENTION

Figure 1:
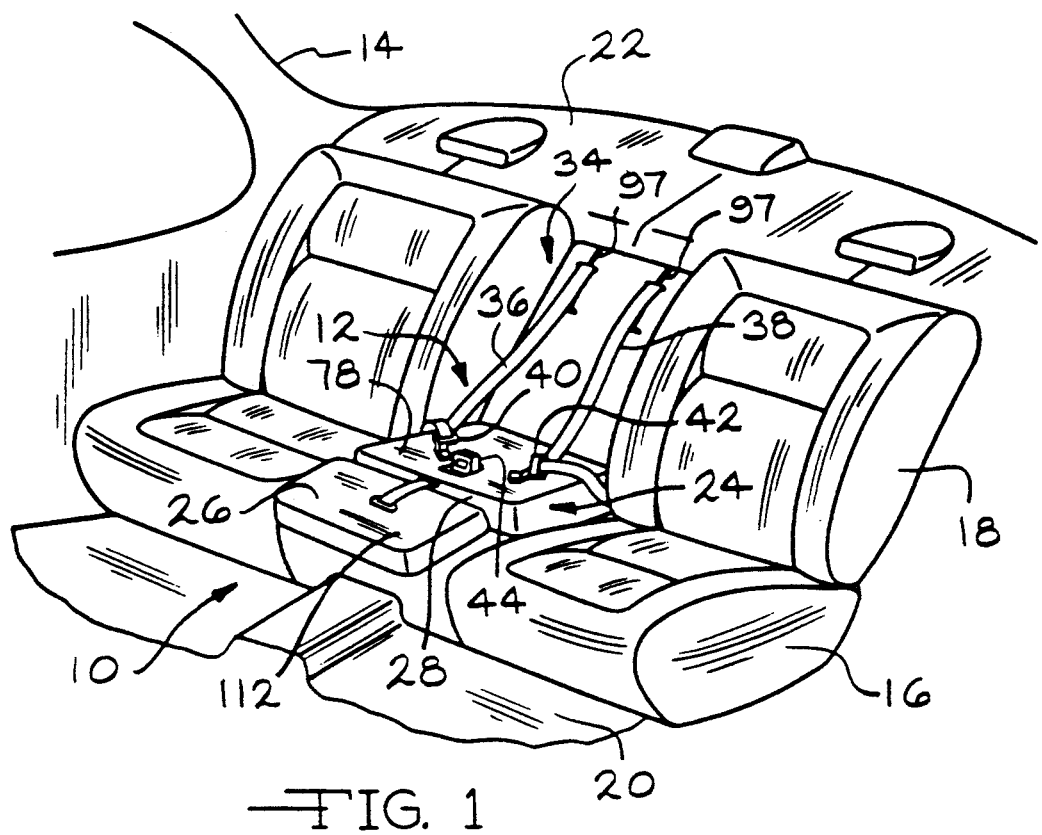
FIG. 1 is a perspective view of the seat assembly of the present invention installed within a motor vehicle showing the integral child seat in a deployed position.

A passenger car seat assembly of the present invention designated generally at 10 and incorporating an integral child seat 12 is shown in FIG. 1 within passenger car 14. Seat assembly 10 is of a conventional bench seat design used as a rear seat in a passenger car. Seat assembly 10 includes a lower seat cushion 16 and a seat back 18 extending upwardly at the rear of the lower seat cushion. The passenger car 14 includes a floor pan 20 and a rear shelf 22 extending rearwardly at the upper end of the seat back 18. The seat cushion 16 and seat back 18 are each formed with a frame structure covered with a foam pad or pads which, in turn, are covered with an upholstery cover forming the exterior surface of the seat assembly.

Figure 2:
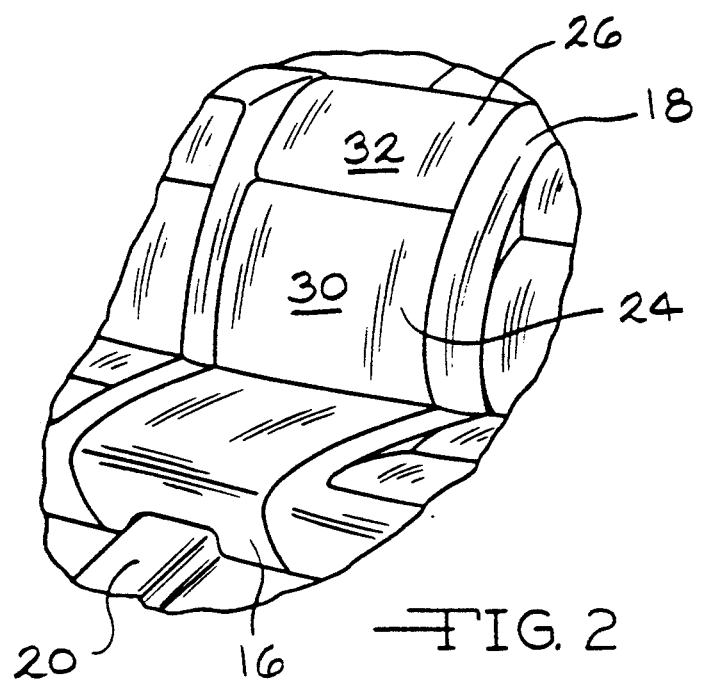
FIG. 2 is a fragmentary perspective view of the seat assembly of FIG. 1 showing the child seat in a stowed position.

The child seat 12 is shown in FIG. 1 in a deployed use position and in FIG. 2 in a concealed stowed position. The child seat includes a panel 24 which is pivotally mounted to the seat back as described below, and forms a child seat cushion when in the deployed position extending forwardly from the seat back and resting on top of the lower seat cushion 16. A footrest 26 is attached to the upper or forward end 28 of the panel 24 by a fabric hinge 30, see FIG. 4.

Figure 3:
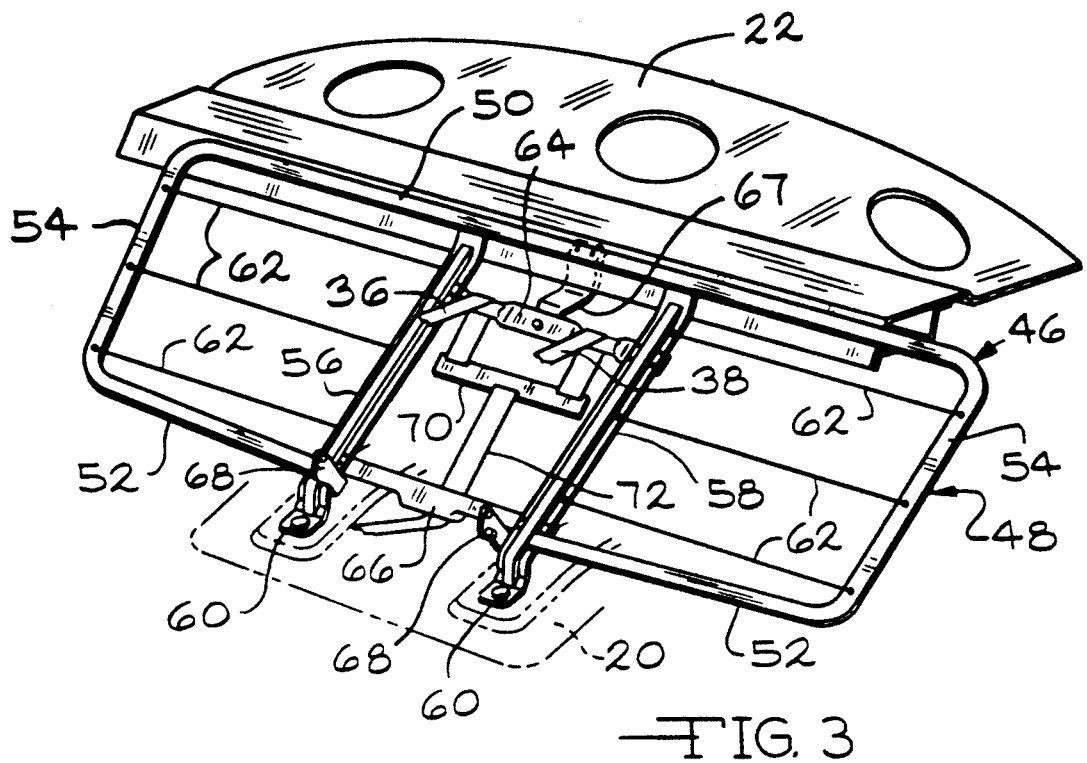
FIG. 3 is a perspective view of the seat back frame attached to the motor vehicle structure.

With reference to FIG. 2, the child seat 12 is shown in the stowed position with the panel 24 generally upright with the footrest 26 extending upwardly from the upper end 28 of the panel 24. In this stowed position, the front surfaces 30 and 32 of the panel 24 and footrest 26 respectively form seating surfaces of the seat back 18. The surfaces 30 and 32 engage the seat cushion when the child seat is deployed. When the child seat is deployed, a belt system 34 is revealed comprising a right belt 36 and a left belt 38. The belts each carry one of the clasps 40 and 42 which are insertable into a buckle 44 attached to the panel 24. The restraint system is shown in greater detail in FIG. 3 along with frame 46 of the seat back.

Frame 46 includes a generally rectangular peripheral frame member 48 comprising a top horizontal segment 50, bottom horizontal segments 52 and upright posts 54 at the transverse ends of the top and bottom segments.

Two upright columns 56 and 58 are each attached at their lower ends through nut and bolt assemblies 60 to the vehicle floor pan 20. At their upper ends, the upright columns are attached to the top segment 50 of the peripheral frame member. Spring wires 62 extend laterally across the seat back from the outer upright posts 54 to the upright columns 56 and 58 to provide support and suspension for the seat back foam pads. In a conventional seat back not integrating a child seat therein, the wires 62 would extend continuously across the seat back.

To integrate the child seat assembly, the seat back frame has been modified to include an upper intermediate member 64 and a parallel lower intermediate member 66 spanning transversely between the two upright columns 56 and 58. The upper and lower intermediate members are used to guide the belts of the restraint system and carry the belt loads. The left and right belts 36 and 38 are coupled at one end to studs 94 of mounting brackets 68. Brackets 68 are in turned fastened to the upright columns 56 and 58 near the attachment of the upright columns to the vehicle floor pan. From the mounting brackets, the belts 36 and 38 extend upwardly over and behind the upper intermediate member 64 and are coupled to an equalizer bar 70. An adjustment strap 72 extends downwardly from the equalizer bar 70 behind and under the lower intermediate member 66 and forward through the panel 24 as shown in FIG. 4.

Panel 24 includes a support plate 74 pivotally attached by the mounting brackets 68 through apertures 92. The apertures 92 define the pivot axis for the panel 24. Plate 74 has an upholstered foam pad 76 attached on one side forming the outer seat back surface 30. A removable upholstered pad 78 attached to the opposite side of support plate 74 forms a seating surface 80 of the child seat cushion. The adjusting strap 72 extends through a narrow tunnel in the panel 24 and past a spring biased pawl 82 having teeth 84 for gripping of the adjustment strap. The pawl 82 is contained within a housing 86 in the support plate 74 which also houses the seat belt buckle 44. The housing of buckle 44 is pivotally mounted about pivot pin 90 so as to rotate from the stowed solid line position to the raised broken line position shown. In the raised position, the two clasps 40 and 42 can be inserted into the buckle by pressing directly against the buckle without the need to use a separate hand to support the buckle while inserting the clasp.

When the seat belt clasps have been inserted into the buckle, the belts combine to form a lap belt extending from each of the mounting brackets 68 to the buckle 44. From the buckle the belts each extend upwardly forming a shoulder belt over each shoulder of the child occupant. The available length of the belts 36 and 38 is adjustable by releasing the pawl 82 and pulling on the adjusting strap 72 in order to lower the equalizer bar 70 and shorten the length of the shoulder belt. To increase the length of the shoulder belts, the pawl is released and the two shoulder belts pulled from the seat back drawing the adjusting strap 72 into the seat cushion as the equalizer bar 70 is raised.

During a vehicle collision, particularly a frontal impact collision in which a child seat occupant is thrown forward relative to the seat, the restraint system 34 restrains the child in the child seat, resulting in tension in the belts 36 and 38. A portion of this tensile load is carried through the mounting bracket 68 to the upright columns 56 and 58 where it is transferred to the vehicle floor pan 20 through the nut and bolt assemblies 60. Another portion of the load is also transferred to the lower intermediate member 66 by the adjusting strap 72 and transferred to the upright columns. The remaining portion of the belt load is carried by the upper intermediate member 64. A restraining bracket 67 is provided to attach the intermediate member 64 directly to the vehicle shelf 22. As a result, the seat belt load carried by the upper intermediate member is transferred directly to the vehicle shelf rather than being carried through components of the seat back frame.

Figure 5:
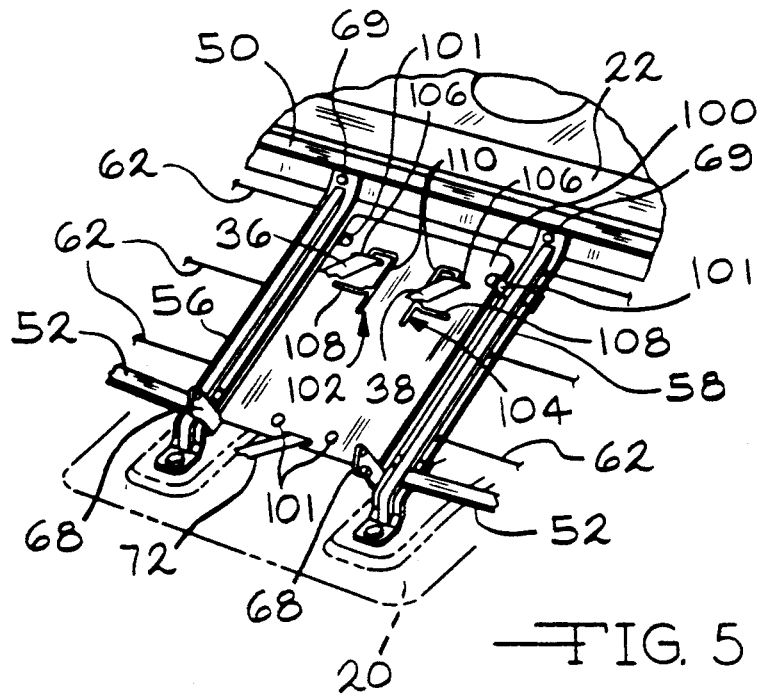
FIG. 5 is a fragmentary perspective view of the seat back frame showing the child seat back panel.

An alternative embodiment of the frame is shown in FIG. 5 in which the bracket 67 is not used. The upright columns 56 and 58 are attached directly to the vehicle shelf through bolts 69 or other similar fasteners providing a load path from the upper intermediate member 64, to the upright columns and to the shelf.

Both the panel 24 and the belts 36 and 38 are attached to the mounting brackets 68 at the lower end of the upright columns 56 and 58. By utilizing a single mounting bracket on each side of the childseat, the number of brackets is minimized. However, most if not all seat assemblies with integral childseat assemblies that use a single bracket on each side, utilize a single attachment to that bracket for both the seat belt and the rotating panel that forms the base of the childseat. Such an arrangement using a single attachment to the bracket is less than optimum in that the preferred location for the panel pivot axis is higher than the preferred location for the attachment of the seat belts. By utilizing a single attachment point, either the location of the pivot axis or the location of the seat belt attachment or both is less than optimal. If not in the optimum position, rotation of the panel can be hindered by the seat assembly upholstery. Positioning of the seat belt attachment location other than the optimal location can result in substandard performance of the seat belt system. To overcome this disadvantage, the brackets 68 are formed with two separate attachments, attachment 92 for the pivot axis of the panel 24 and studs 94 for mounting of the seat belt lower ends. The pivot axis for the panel 24 is preferably above and forward of the seat belt attachment point. Bracket 68 results in placement of both the pivot axis and the belt attachment point at the optimum locations for each.

The child seat cushion pad 78 is coupled to a removable seat back pad 96 by a flexible fabric hinge 98. The seat back pad is supported by a rigid back panel 100 attached to the upper and lower intermediate members 64 and 66 by fasteners 101 as shown in FIG. 5. The back panel 100 includes a pair of slots 102 and 104 for the right and left belts 36 and 38 respectively. Each of the slots have a pair of horizontal segments 106 and 108 to provide two height positions for the belts 36 and 38 to extend through. A connector slot 110 extends between the two horizontal slot segments to provide a path for moving the belts from one horizontal segment to the other. The upholstery pad 78 for the seat cushion and pad 96 of the seat back are removably mounted to the seat for enabling the pads to be removed for cleaning. The seat back cushion pad 96 includes a slot 97 to enable removal of the pad from the belts.

The inner or top surface 112 of the footrest is provided with a durable wear resistant material for use in contact with the shoes of the child occupant. A removable cover can also be used if desired. The panel 24 and footrest 26 are held in the stowed position by frictional engagement with the surrounding cushions of the seat back. If desired, the panel 24 and foot rest 26 can be held in place by other means, for example by a hook and loop type fastener such as Velcro.

The seat back frame, by being coupled to the vehicle shelf either by the bracket 67 or by attachment of the upright columns to the shelf, provides a short load path for seat belt loading directly from the belts to the vehicle structure with a minimal number of load carrying members in the seat back frame. An efficient load path is provided minimizing the quantity of load bearing components in the seat assembly and thus reducing the seat assembly weight. In contrast, with a child seat module, the module itself carries the child seat belts and must be designed to carry that load. The fasteners for attaching the module to the seat back frame must then be capable of carrying this load along with those components of the seat back frame to which the module is attached. A long load path of many components is the result.

It is to be understood that the invention is not limited to the exact construction illustrated and described above, but that various changes and modifications may be made without departing from the spirit and scope of the invention as defined in the following claims. For example, while the seat assembly has been shown and described as being in the middle of a bench seat, the child seat could be integrated into either the left or right seating positions of the bench seat, if so desired.

We claim:

1. A seat back for use in a passenger car in a generally upright position, said seat back extending transversely side to side in said passenger car, said passenger car having a horizontal shelf rearward of said seat back and a lower floor pan, said seat back comprising:
   a generally rectangular peripheral frame member including generally horizontal top and bottom portions and upright posts therebetween at transverse ends of said frame;
   a pair of upright columns having upper ends attached to said top portion of said peripheral member and lower ends having mounting portions adapted to be attached to said vehicle floor pan below the bottom portion of said peripheral frame member;
   upper and lower vertically spaced intermediate members extending between said upright columns and having ends attached thereto;
   means for securing said upper intermediate member to said vehicle shelf;
   a panel mounted to said upright columns for rotation about a pivot axis adjacent said bottom portion of said peripheral frame member, said panel having a first position extending generally upright from said pivot axis and a second position extending generally forwardly from said pivot axis forming a support platform for use as a child seat lower portion; and
   restraint means for restraining a child occupant seated on said panel, said restraint means including one or more belts forming a closed loop surrounding said upper and lower intermediate members and said occupant seated on said panel whereby a portion of the restraining loads applied by said occupant on said one or more belts are applied directly from said one or more belts to said intermediate members and from there to said shelf and floor pan.

2. The seat back of claim 1 wherein said securing means includes a bracket extending between and connected to said upper intermediate member and said shelf.

3. The seat back of claim 1 wherein said securing means includes a mounting portion at the upper ends of said vertical columns for attachment of said columns to said shelf.

4. The seat back of claim 1 wherein said restraint means includes:
   a buckle carried by said panel;
   a pair of belts each having two ends, a first end of said belts being coupled to said vertical columns near said mounting portions at the lower ends of said columns and extending upwardly therefrom over and behind said upper intermediate member and terminating in a second end;
   an equalizer bar having ends coupled to said second ends of said belts; and
   an adjustment strap having one end coupled to said equalizer bar between said belt ends, said adjustment strap extending behind and under said lower intermediate member and forward to a releasable retainer carried by said panel whereby said adjusting strap can be selective released by said retainer and moved to raise or lower said equalizer bar to vary the length of said belts between said first ends of said belts and said upper intermediate member.

5. The seat back of claim 4 wherein said buckle includes a housing pivotally mounted directly to said panel.

6. The seat back of claim 4 further comprising mounting brackets attached to each upright column adjacent the lower ends of said columns, said first ends of said belts being attached to said mounting brackets at a first location and said panel being pivotal attached to said mounting brackets at a second location for rotation about said pivot axis.

7. The seat back of claim 6 wherein said second location on said mounting brackets for pivotally attaching said panel is above and forward of said first location on said mounting brackets for attaching said belts.

8. The seat back of claim 1 further comprising:
   a foot rest attached to a front end of said panel when in said second position and extending forwardly from said panel, said foot rest being positioned above said panel when said panel is in said first position; and
   a fabric hinge joining said foot rest to said panel.

9. The seat back of claim 1 further comprising:
   a support panel fastened to a forward side of said intermediate members, said support panel including slots adjacent said upper immediate member for extension of said belts therethrough, each slot having a pair of vertically spaced horizontal segments and a vertical connector segment between said horizontal segments to enable movement of said belts between said spaced horizontal segments to vary the location of said belts.

10. A seat assembly for a motor vehicle comprising:
    a lower seat cushion having a rear end and a seat back extending generally upwardly at said rear end of said seat cushion;
    said seat back including a frame and upholstery covering said frame, said upholstery forming a seating surface for said seat back, said seating surface having a cavity with a lower end and spaced sides;
    said frame including a pair of mounting brackets at the lower end of said cavity, one bracket at each of said sides of said cavity;

a panel rotatably mounted to said mounting brackets for rotation about a pivot axis, said panel having an upright first position in which said panel forms a portion of said seat back seating surface and a forwardly extending second position in which said panel rests upon said seat cushion forward of said seat back, said panel being disposed in said cavity when said panel is in said upright position; and restraining means including a pair of belts stored in said cavity behind said panel when said panel is in said upright position, said belts having lower ends attached to said mounting brackets at the lower end of said cavity at a location spaced from said pivot axis.

11. The seat back of claim 10 wherein said pivot axis is above and forward of said belt attachment to said brackets.

* * * * *